Patented Feb. 23, 1954

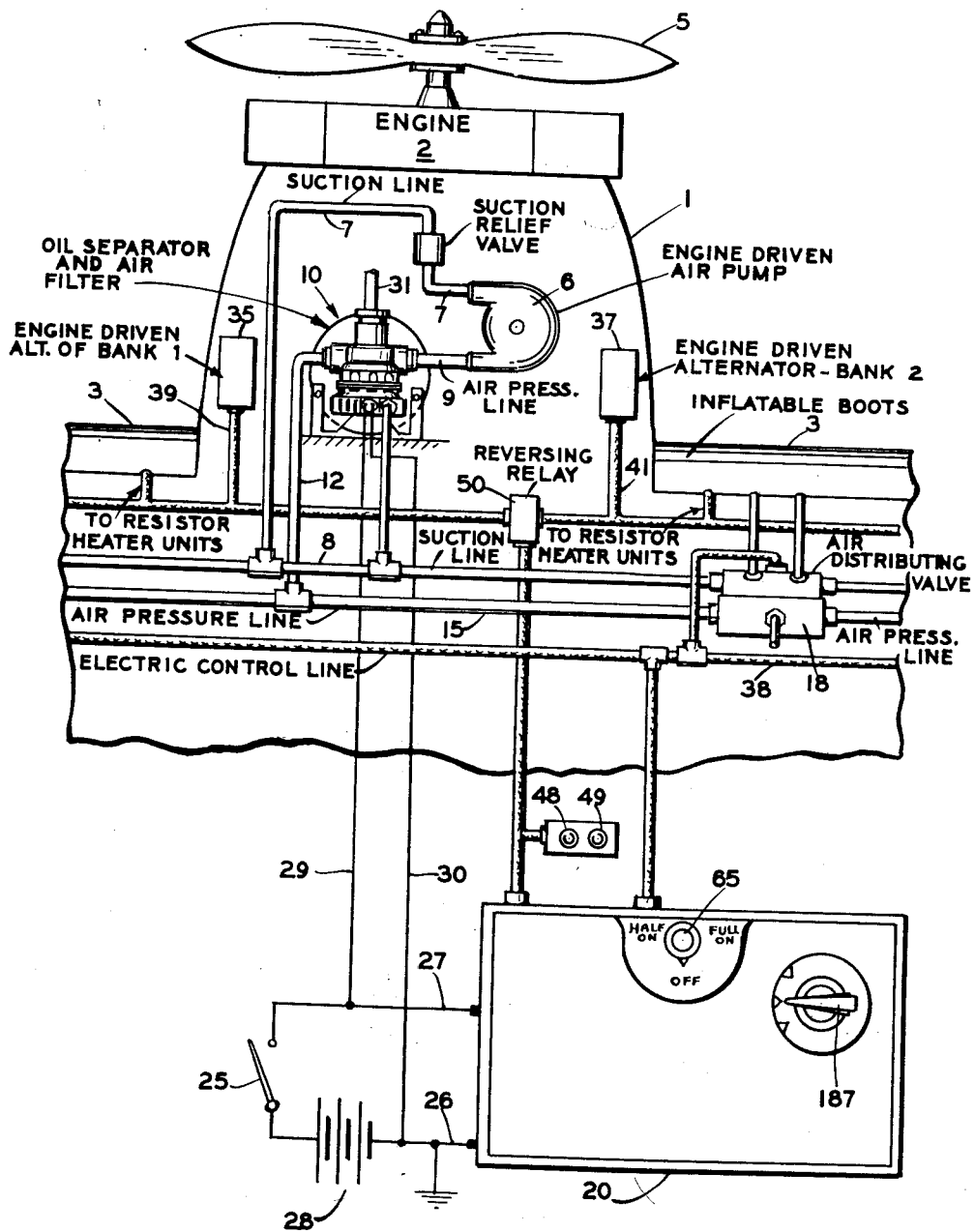

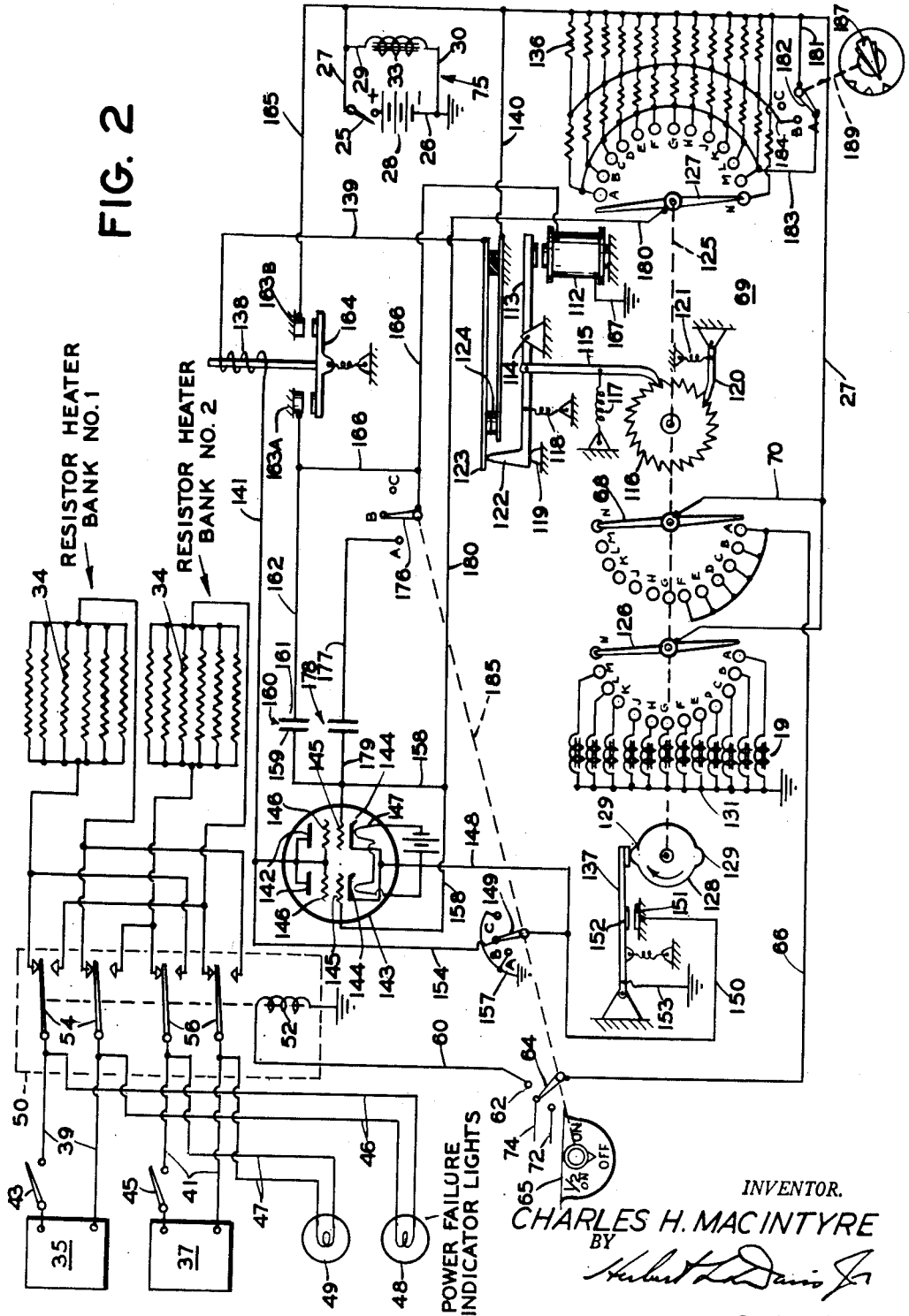

2,670,161

UNITED STATES PATENT OFFICE 2,670,161

CONTROL MECHANISM AND APPARATUS FOR AN ICE ELIMINATING SYSTEM HAVING INFLATABLE MEMBERS AND HEATER ELEMENTS

Charles H. MacIntyre, Hasbrouck Heights, N. J., assignor to Bendix Aviation Corporation, Teterboro, N. J., a corporation of Delaware Application August 10, 1951, Serial No. 241,356

4 Claims. (Cl. 244—134)

The present invention relates to improvements in the operating mechanism for an ice eliminating system of the electro-pneumatic type such as disclosed in Taylor U. S. Patent No. 2,418,205 granted April 1, 1947 and assigned to The B. F. Goodrich Company and which includes distortable inflatable members for removing ice from an airfoil surface of an aircraft in cooperation with electric resistor heater elements embedded in said members.

The system normally operates with the inflatable members in continuous cyclic operation through the operation of suitable air distributing valve mechanism such as disclosed in Lawrence et al. U. S. Patent No. 2,515,519 granted July 18, 1950 and assigned to Bendix Aviation Corporation and in which the distributing valve mechanisms are cyclically operated in accordance with a schedule prescribed by the stepper switches of an electronic timer such as disclosed in Lauricella U. S. Patent No. 2,444,210 granted June 29, 1948 and assigned to Bendix Aviation Corporation. While the inflatable members in normal operation are in continuous cyclic operation, the heater elements embedded in the inflatable members are continuously energized. The electric heating elements are divided into two banks, each bank consisting of the ice eliminating panels on one wing of the aircraft and half the empennage, and each bank is normally energized by the electric power supplied by a separate alternator driven by the aircraft engine.

An object of the invention is to provide novel means, whereby should either of the aforenoted alternators fail, the output of the remaining alternator may be alternately transferred from one heater bank to the other so as to provide effective removal of the ice from the airfoil surfaces.

Another object of the invention is to provide an emergency control system for the heater elements including a reversing switch or transfer relay to alternately switch the remaining alternator from one heater bank to the other under control of the electronic timer for the inflatable ice eliminating members.

Another object of the invention is to provide an emergency control system for the heater elements effective upon failure of the power supply for one of the banks of heater elements to cause simultaneous operation of both heater elements and inflatable members under control of a single timing apparatus so as to prevent the accumulation of ice on or the removal of ice from aerofoil surfaces of an aircraft.

The above and other objects and features of the invention will appear more fully hereinafter from a consideration of the following description taken in connection with the accompanying drawings wherein one embodiment of the invention is illustrated by way of example.

In the drawings:

Figure 1 is a fragmentary plan view of an aircraft showing diagrammatically the manner in which the novel control apparatus is connected into the ice eliminating system.

Figure 2 is a diagrammatic view illustrating an electrical timing circuit embodying the invention.

Referring to the drawing of Figure 1, there is shown an aircraft indicated by the numeral 1 having an engine 2 and inflatable elements or boots 3 mounted along the leading edge of the plane and of the type including resistor heating elements embedded thereon. The operating mechanism for the inflatable elements are of a type such as disclosed in the copending application Serial No. 733,960 filed March 11, 1947, by Donald M. Lawrence, U. S. Patent No. 2,476,198 granted July 12, 1949 to Donald M. Lawrence and in U. S. Patent No. 2,515,519 granted July 18, 1950 to Donald M. Lawrence et al. and all of which have been assigned to Bendix Aviation Corporation.

The engine 2 is arranged so as to drive an aircraft propeller 5. An air pump 6 is also driven in a conventional manner by the engine 2 and has provided a suction conduit 7 leading to the main suction line 8 through a suitable suction relief valve, as shown.

An air pressure line 9 leads from the pump 6 to the inlet of a pressure unloading valve or device indicated generally by the numeral 10 and which may be of the type disclosed and claimed in the aforementioned application Serial No. 733,960. The air passes through the device 10 and into the outlet conduit 12 upon energization of a control solenoid provided therein as explained in the application Serial No. 733,960. During the passage of the air through the device 10, any particles of oil which may enter the air from the pump 6 or other source, is separated and the air is filtered of dirt and other extraneous matter by an oil separator and air filter provided in the device 10 as disclosed and claimed in the U. S. application Serial No. 733,960. The air flow thus processed, is conducted through the conduit 12 to the air pressure line 15.

The suction and air pressure lines 8 and 15 lead to suitable air distributor valves 18 having control solenoids 19 shown diagrammatically in Figure 2 and which are electrically controlled by a timer indicated generally by the numeral 20 so as to operate the inflatable boot elements 3. A plurality of such distributor valves are preferably provided of a type such as disclosed and claimed in the aforenoted U. S. Patent No. 2,515,519. The timer 20 includes as shown in the Figure 2 an electronic timer which may be of the type disclosed and claimed in U. S. Patent No. 2,444,210 granted June 29, 1948 to John W. Lauricella and assigned to Bendix Aviation Corporation.

A manually operable switch 25 is arranged to simultaneously close both circuits 26—27 and 29—30 to condition the timer 20 for operation, as well as cause the unloading valve of the device 10 to direct air under pressure through line 12 to the pressure line 15 to condition the same for subsequent operation of the distributor valves 18. In the system disclosed when switch 25 is opened and operation of the inflatable ice eliminating system terminated the unloading valve of the device 10 closes the conduit 12 and directs the air flow from the conduit 9 to an overboard dump 31, as explained in the application Serial No. 733,960.

The unloading valve of the device 10 has a control solenoid 33, shown schematically in Figure 2, and the device 10 may be of the type disclosed and claimed in the application Serial No. 733,960 in which the unloading valve is arranged to close the passage 12 and open the discharge passage 31 to the passage 9 upon deenergization of the solenoid 33, and close the passage 31 to passage 9 and open the passage 12 to the passage 9 upon energization of the solenoid 33.

In addition to the inflatable elements 3, there are embedded therein suitable electric resistor heater elements 34, shown schematically in Figure 2, and which may be of a type such as disclosed in the Taylor U. S. Patent No. 2,418,205. The energizing power for these electric heating elements is provided by two alternators 35 and 37 driven by the engine 2 and connected through suitable electrical conduits 39 and 41, respectively, to the heating elements and controlled by switches 43 and 45, as shown in Figure 2. The electric heating elements are divided into two banks, each bank consisting of the heating elements on one wing and half empennage and normally energized by its associated engine driven alternator 35 or 37.

Connected across the lines 39 and 41 by conductors 46 and 47, respectively, are indicator lights 48 and 49 which may be conveniently mounted in the cabin of the aircraft for ready observation by the pilot of the aircraft to indicate failure of the alternators 35 and 37, respectively.

As shown diagrammatically in Figure 2, the power lines 39 and 41 lead to the heater elements 34 of the No. 1 and No. 2 heater banks through a reversing relay 50 controlled by a solenoid 52. The solenoid 52 is effective upon energization to actuate relay switch arms 54 so as to transfer the connection of the alternator 35 from the No. 1 bank of resistor heater elements to the No. 2 bank and to actuate relay switch arms 56 so as to transfer the connection of the alternator 37 from the No. 2 bank to the No. 1 bank of resistor heater elements. When the solenoid 52 is deenergized, the relay switch arms 54 and 56 are spring biased to the position shown so as to connect the alternator 35 to the No. 1 bank and the alternator 37 to the No. 2 bank of resistor heater elements.

The solenoid 52 may be connected by a conductor 60 to a contact 62 controlled by a switch arm 64 manually operable by a suitable adjustment knob 65 mounted on the panel of the timer 20. The switch arm 64 is in turn connected by a conductor 66 to contacts 68A–F controlled by a rotary switch arm 68 of a stepper relay 69, shown in Figure 2, and the operation of which is hereinafter explained. The contacts 68G–N are also controlled by the rotary switch arm 68 and are open. The rotary switch arm 68 is in turn connected by a conductor 70 to the conductor 27 leading through the switch 25 to the source of electrical energy 28. The switch arm 64 in addition to controlling contact 62 also cooperates with open contacts 72 and 74.

Thus, upon failure of either alternator 35 or 37, as indicated by its associated indicator light 47 or 49 as the case may be, the pilot adjusts the knob 65 to the "half on" position whereupon switch arm 64 closes contact 62 and the stepper relay switch arm 68 thereupon serves to cycle the reversing switch 50 so as to alternately transfer the output of the remaining alternator first to one bank of heater elements by closing the contacts 68A–F and then to the other bank of heater elements by opening the contacts 68A–F and closing one of the remaining contacts 68–G–N.

Referring now to the drawing of Figure 2, there is shown a system for timing the operation of the stepper relay 69 to normally control the energization of a series of electromagnets 19 which serve to control boot-inflating valves 18 of the ice eliminating system as described and claimed in the aforenoted Lawrence et al. U. S. Patent No. 2,515,519.

The stepper relay 69 may be of a conventional type comprising an electromagnetic winding 112 which controls the movement of an armature 113 pivotally supported at 114. A ratchet arm 115 is pivotally mounted on the armature 113 and is biased into engaging relation with a ratchet wheel 116 by a spring 117. A second spring 118 biases the armature 113 in a counterclockwise direction into contacting relation with a stop 119. A pawl 120 is biased into engaging relation with the teeth of the ratchet wheel 116 by a spring 121 so as to prevent rotation of the ratchet wheel 116 in a counter-clockwise direction.

It will be readily seen from the foregoing that upon energization of the electromagnet 112 the armature 113 will be pivoted in a clockwise direction in opposition to the force of the spring 118 causing the ratchet arm 115 to engage the next succeeding tooth of the ratchet wheel 116. At the extreme limit of movement of the armature 113 an actuating member 122 carried thereby engages the free end of a leaf spring 123 so as to open the contacts of a switch 124.

The opening of the switch 124 breaks the circuit of the electromagnet 112, as will be explained hereinafter, causing de-energization of the electromagnet 112, whereupon the spring 118 actuates the armature 113 in a counterclockwise direction causing the pawl 115 to impart an increment of movement to the ratchet wheel 116 in a clockwise direction.

The ratchet wheel 116 is connected through a suitable shaft 125 indicated herein by dotted lines to switch arms 68, 126 and 127.

The switch arms 68, 126 and 127 are each arranged to contact in succession a series of contacts 68A-N, 126A-N and 127A-N. The switch arms 68, 126 and 127 move from one contact to the next succeeding contact for each increment of movement imparted to the ratchet wheel 116 by the stepper relay 69 and upon one end of the switch arm moving out of contacting relation with the contact N, the opposite end closes the contact A.

The switch contacts 126A-N are connected respectively through suitable electrical conductors to one terminal of corresponding electromagnets 19. The opposite terminal of the electromagnets 19 are connected by an electrical conductor 131 to the negative terminal of a source of electrical energy 28 through a grounded connection.

The switch arm 126 is connected by the conductor 27 through the manually operable control switch 25 to the positive terminal of the source of electrical energy 28.

The contact 126N is an open contact so that upon the switch arm 126 contacting the same, the circuit to all of the electromagnets 19 are open for a purpose which will appear hereinafter.

The switch arm 127 is arranged to sequentially close contacts 127A-N connected to suitable resistor elements 136 which are in turn connected at the opposite end to conductor 27 for a purpose which will be explained hereinafter.

The shaft 125 also drives a cam 128 having portions 129 arranged to actuate an off normal switch 137 to an open position upon the switch arms 68, 126 and 127 being positioned so as to close the respective contacts 68N, 126N and 127N. Upon the switch arms 68, 126 and 127 being adjusted into contacting relation with one of the other contacts, the cam 128 permits the switch 137 to close for purposes which will be explained.

A relay winding 138 has one terminal connected by an electrical conductor 139 through the normally closed switch 124 and a conductor 140 to the positive terminal of the source of electrical energy 28 through the control switch 25. The opposite terminal of the winding 138 is connected by an electrical conductor 141 to an anode or plate 142 of an electronic valve 143.

The electronic valve 143 has cathodes 144, control grids 145, shield grids 146, heater or filaments 147 and the plates 142.

The cathodes 144 are connected by a conductor 148 to a manually operable selector switch 149 and through a conductor 150 to one contact 151 of the off normal switch 137. The opposite contact 152 is connected through the switch arm 137 and a grounded conductor 153 to the negative terminal of the source of electrical energy 28.

The switch 149 cooperates with switch contacts 149A-C. A conductor 154 leads from the contact 149B to the conductor 141 so that upon switch arm 149 closing contact 149B the electronic valve 143 may be effectively shunted.

The remaining switch contacts 149A and 149C are connected to the negative terminal of the source of electrical energy 28 through a grounded conductor 157. Thus the cathodes 144 may be connected to the negative terminal of the source of electrical energy 28 by adjustment of switch 149 so as to close contact 149A or 149C or the timer system may be disconnected by adjustment of the switch 149 to close contact 149B and the opening of the off-normal switch 137 as shown.

With the switch 149 adjusted to close contact 149A or 149C the electron flow from the cathodes 144 to the plates 142 is controlled by grids 145 connected by a conductor 158 to a plate 159 of a condenser 160. The opposite plate 161 of the condenser 160 is connected by a conductor 162 to a contact 163A of a normally open switch 164 controlled by the electromagnetic relay winding 138. An opposite contact 163B is connected by a conductor 165 to the conductor 140 and thereby to the positive terminal of the source of electrical energy 28 through the manually operable switch 25.

A conductor 166 leads from the conductor 162 to the relay winding 112 which is connected at its opposite terminal through a grounded conductor 167 to the negative terminal of the source of electrical energy 28.

Thus energization of relay winding 138 causes in turn relay 112 to be energized, whereupon switch 124 is actuated to an open position, thereby effecting deenergization of winding 138, opening of switch 164 and deenergization of the stepper relay winding 112.

A switch arm 176 is connected to the conductor 166. The switch arm 176 cooperates with switch contacts 176A-C. The contacts 176B and 176C are open contacts, while the contact 176A is connected by a conductor 177 to a second capacitor or condenser 178 connected by conductor 179 to the conductor 158 and across the capacitor 160 upon the closing of the switch contact 176A so as to increase the capacity of the timing condenser.

A conductor 180 leads from the conductor 158 to the stepper relay switch arm 127. Thus the plate 159 of the capacitor 160 is connected by the conductors 158 and 180 to the switch arm 127 which, as previously described, is arranged to close sequentially the contacts 127A through 127N.

Leading from the contacts 127A through 127N, respectively, are the resistors 136A-N each of a value sufficient to effect a predetermined discharge period for capacitor 160 or time interval for energizing the electromagnet 19 corresponding thereto. The resistors 136A-M may be of different value so as to effect different time intervals of operation for each load device.

Leading from the opposite terminals of the resistors 136A-N is the conductor 27. Connected to the conductor 27 by a conductor 181 is a switch arm 182 for cooperating with contacts 182A-C. The conductor 181 connects the switch arm 182 to the positive terminal of the source of electrical energy 28 through the control switch 25.

The switch arm 182 is arranged to selectively contact one of the three contacts including open contacts 182C, contact 182A connected by a conductor 183 to the contacts 127A-M so as to shunt out of the time delay circuit the resistors 136A-M and contact 182B connected by an electrical conductor 184 to the resistors 136A-M at a point intermediate the opposite ends of the latter resistors.

It will be seen then that when the switch arm 182 closes the contact 182B, a portion of the resistor 136 leading from the contacts 127A-M will be shunted out of the circuit leading from the positive terminal of the source of electrical energy 28 and the plate 159 of the condenser 160. However, upon the switch arm 182 contacting the open contact 182C the full resistance of the resistor 136 leading from the contacts 127A-M will be inserted in the latter circuit.

The control switches 64, 149 and 176 are arranged for operation in unison from a single control knob 65 operatively connected thereto by a shaft 185 indicated by dotted lines. The switch 182 is also controlled manually by a knob 187 operatively conected thereto by a shaft 189 and conveniently mounted on the panel of the timer 20.

Operation

The foregoing electronic timer is particularly designed for use in conjunction with the manifold type of ice eliminating system for airfoil surfaces of aircraft and is arranged to open the boot inflating valves automatically in the proper sequence for the proper time intervals. Since ice does not form at the same rate or to the same degree on all occasions, a certain flexibility of control has been incorporated to permit the operator to vary certain components of the system to suit the prevailing conditions.

Referring to the drawing of Figure 2, and with the control switches in the position shown, operation is initiated by first closing the switch 25 and thereafter adjusting the control knobs 65 and 187 to one of the operative positions such as the "full on" and "normal air flow positions" respectively at which the switch arm 64 engages contact 72, switch arm 149 engages contact 149A and switch arm 176 engages 176A, while switch arm 182 closes contact 182B through the adjustment of knob 187.

The cathodes 147 are then connected through the switch 149 to the negative terminal of the source of electrical energy 28. The bias applied at the grids 145 is positive at the time the switch 149 is closed since the grids 145 are connected through the switch arm 127 and contact 127N to the positive terminal of the source 28. Thus a large plate current flows effecting energization of the relay winding 138 causing switch 164 to close contacts 163A and 163B. The closing of the switch 124 then effects a charging circuit for the capacitor 160 and 178 in which the electronic flow from the cathodes 144 to the grids 145 and through the conductors 158 applies a negative charge to the plate 159 of the capacitor 160, and like plate of capacitor 178 while a positive charge is applied to the plate 161 and like plate of capacitor 178 through conductors 162, and switch 176, switch 164, conductor 165 and conductor 140 to the positive terminal of the source of electrical energy 28.

The closed relay switch 164 thus causes the condensers 160 and 178 to become quickly charged and in turn the relay winding 112 to become energized so as to open the switch 124 in the plate circuit.

The opening of the interrupter switch 124 then cuts off the plate current, which de-energizes the relay winding 138 which opens switch 164 and the energizing circuit for the stepper relay winding 112. The spring 118 then draws the armature 113 downward in a counterclockwise direction and effects movement of the ratchet gear 116 together with the stepper switches 126 and 127 to a position closing contacts 126A and 127A respectively and energizing circuit 19A.

Upon the opening of switch 164, the direction of electron flow relative to the condensers 160 and 178 reverses and the condensers 160 and 178 discharge. Thus, upon the opening of switch 164, there is an electron flow to the positively charged plate 161 of the condenser 160 and like plate of condenser 178 through grounded conductor 167, stepper relay winding 112, conductor 166, switch 176 and conductors 162 and 177. The negatively charged plate 159 of the condenser 160 and like plate of condenser 178 discharges through the conductor 158, conductor 180, stepper relay switch 127, contact 127A, portion of resistance 136A, switch 182 and conductor 27 through switch 25 to the positive terminal of the source 28.

The negative charge on the plate 159 of the condenser 160 and like plate of condenser 178 applies a negative bias to the grids 145 through conductor 158 which is sufficient to keep the grid biased beyond cut off for a predetermined period dependent upon the value of the resistance 136 connected in the discharging circuit through operation of the stepper relay switch 127.

The charge on the condensers 160 and 178 is thus gradually neutralized through the resistance 136 until the bias on the grids 145 becomes sufficiently positive to allow enough plate current to flow to again effect energization of relay winding 138 so as to close switch 164. The time required is dependent upon the time constant of the resistor 136 and capacitor 160.

When the relay winding 138 is energized closing switch 164, the condenser 160 and condenser 178 are again recharged. The normally open switch 164 remains closed until the interrupter contacts 124 are opened momentarily by energization of the stepper relay 112 opening the circuit for the relay winding 138 and de-energizing the stepper relay 112 so as to cause the stepper switches 126 and 127 to advance to position 126B and 127B respectively. A new timing interval then begins during which circuit 19B is energized.

Similarly the load circuits 19C-19M are energized for time intervals depending upon the value of the then connected resistor 136 and condensers 160 and 178. However, upon the stepper switch 127 moving to a position closing contact 127N, the cam 128 is adjusted so as to position the portion 129, as shown in the drawing, so as to open the off normal switch 137.

If control switch 149 is adjusted so as to close contacts A or C, the cathodes 144 are connected through grounded conductor 157 to the negative terminal of the source 28 and hence in this position of control switch 149, the operation is continuous between cycles. If control switch 149 has been returned to the "off" position so as to engage open contact 149B then the opening of the off normal switch terminates operation of the timer at the home position since then no power is supplied to the cathode 144. If control switch 182 be adjusted so as to close open contact 182C, a high resistance 136A-M gives a greater delay period of operation for each boot than if switch 182 closes contact 182B.

The system normally operates with the inflatable boots in continuous cyclic operation while the heater elements are continuously energized by the alternators 35 and 37 as heretofore described. Upon failure, however, of one of the alternators 35 or 37 as indicated by the extinction of one of the indicator lights 48 or 49, the operator will thereupon adjust the knob 65 from the "full on" position to the "half on" position causing switch 64 to close contact 62, switch 149 to close contact 149C, and switch arm 176 to open contact 176A and close open contact 176C. The opening of contact 176A causes the condenser 178 to be switched out of the timing circuit so as to decrease all time intervals of inflation of the inflatable boots 3 by a predetermined value of, for example, fifty per cent, while the adjustment of the switch 64 so as to close contact 62 connects the control winding 52 of the reversing relay 50 to the stepper relay switch contacts 68A-F so that the stepper relay switch arm 68 cycles the power from the remaining alternator to half of the heated sections for half of the cycling time and to the other half of the heated sections for the remaining half of the cycling time so as to assure efficient removal of the ice from the airfoil surfaces under such emergency conditions through the joint action of the inflatable boots 3 and the resistor heater elements 34.

Although only one embodiment of the invention has been illustrated and described, various changes in the form and relative arrangements of the parts may be made to suit requirements.

What is claimed is:

1. For use with an ice eliminating system for aircraft of the class including a plurality of inflatable ice eliminating members, means for operating said inflatable members, electric heater elements embedded in said members for effecting the removal of ice from said members, a pair of electric generators, one of said generators operatively connected for supplying electric energy to one set of said heater elements and the other of said generators operatively connected for supplying electric energy to another set of said heater elements; means for controlling said inflatable members and heater elements, said control means comprising relay switch means for transferring the operative connections of at least one of said electric generators from one to the other of said sets of heater elements, a timer normally operative for providing a sequence of predetermined periods of operation of said inflatable members, said relay including a control winding for operating said switch means, and means for operatively connecting said timer to said control winding for operating said relay switch means so as to alternately effect full energization of each of said sets of electric heater elements by at least said one generator for periods of operation controlled by said timer.

2. The combination defined by claim 1 including indicator means operatively connected to said generators for indicating failure of the other of said generators, and operator-operative switch means to effectuate the means for operatively connecting the timer to the control winding upon failure of the other of said generators.

3. An ice eliminating system for an aircraft, comprising, in combination, two sets of electric heater elements for effecting the removal of ice from an airfoil surface of said aircraft, a pair of electric generators, means operatively connecting one of said generators so as to supply electric energy to one set of said heater elements and the other of said generators so as to supply electric energy to another set of said heater elements, said connecting means including switch means for transferring the operative connections of said electric generators from one to the other of said sets of heater elements, control means for operating said switch means to effect said transfer, a timer, and means operatively connecting said timer to said control means for alternately effecting operation of said sets of electric heater elements by at least one of said generators for predetermined periods.

4. The combination defined by claim 3 including indicator means operatively connected to said generators for indicating failure of one of said generators, and operator-operative means to effectuate the means for operatively connecting the timer to the control means.

CHARLES H. MacINTYRE.

References Cited in the file of this patent

UNITED STATES PATENTS

| Number | Name | Date |
|---|---|---|
| 2,025,653 | Dyer | Dec. 24, 1935 |
| 2,393,635 | Hubbard | Jan. 29, 1946 |
| 2,418,205 | Taylor | Apr. 1, 1947 |
| 2,444,208 | Taylor et al. | June 29, 1948 |
| 2,444,210 | Lauricella | June 29, 1948 |